US008344055B1

(12) United States Patent
Mabey et al.

(10) Patent No.: US 8,344,055 B1
(45) Date of Patent: Jan. 1, 2013

(54) AMMONIUM PHOSPHATE FIRE RETARDANT WITH WATER RESISTANCE

(75) Inventors: Michael John Mabey, Sherwood Park (CA); William Kish, Wadsworth, OH (US)

(73) Assignee: No-Burn Investments, L.L.C., Wadsworth, OH (US)

( * ) Notice: Subject to any disclaimer, the term of this patent is extended or adjusted under 35 U.S.C. 154(b) by 255 days.

(21) Appl. No.: 12/803,557

(22) Filed: Jun. 29, 2010

Related U.S. Application Data

(60) Provisional application No. 61/269,981, filed on Jul. 1, 2009, provisional application No. 61/270,861, filed on Jul. 14, 2009, provisional application No. 61/273,614, filed on Aug. 6, 2009.

(51) Int. Cl.
C08K 3/32 (2006.01)
C08K 3/30 (2006.01)

(52) U.S. Cl. ........ 524/416; 382/232; 382/233; 382/244; 382/246; 382/250; 348/231.99; 348/231.2; 348/65; 345/634; 514/531; 524/62

(58) Field of Classification Search .................. 382/232, 382/233, 244, 245, 246, 250, 251, 239, 305; 348/231.99, 231.2, 65; 345/634; 514/531; 524/62, 416
See application file for complete search history.

(56) References Cited

U.S. PATENT DOCUMENTS

| | | | |
|---|---|---|---|
| 3,068,187 | A | 12/1962 | Bolstad et al. |
| 3,415,765 | A | 12/1968 | Hallonquist et al. |
| 4,725,382 | A | 2/1988 | Lewchalermwong |
| 5,468,284 | A | 11/1995 | Sturm |
| 5,869,184 | A | 2/1999 | Oishi et al. |
| 6,416,789 | B1 | 7/2002 | Marks et al. |
| 6,582,732 | B1 | 6/2003 | Bender et al. |
| 6,635,714 | B1 | 10/2003 | Wood et al. |
| 6,811,731 | B2 | 11/2004 | Archer et al. |
| 6,833,414 | B2 | 12/2004 | Granel et al. |
| 6,982,049 | B1 | 1/2006 | Mabey et al. |
| 6,989,113 | B1 | 1/2006 | Mabey |
| 7,037,966 | B2 | 5/2006 | Zheng et al. |
| 7,482,395 | B2 | 1/2009 | Mabey et al. |
| 7,587,875 | B2 | 9/2009 | Kish et al. |
| 2005/0022466 | A1 | 2/2005 | Kish et al. |
| 2005/0058689 | A1 | 3/2005 | McDaniel |
| 2006/0167131 | A1 | 7/2006 | Mabey et al. |
| 2006/0189232 | A1 | 8/2006 | Kish et al. |
| 2006/0269677 | A1 | 11/2006 | Ward et al. |
| 2007/0170404 | A1 | 7/2007 | Kish |
| 2007/0176156 | A1 | 8/2007 | Mabey et al. |
| 2007/0185238 | A1 | 8/2007 | Kish |
| 2008/0054230 | A1 | 3/2008 | Mabey et al. |
| 2009/0088481 | A1 | 4/2009 | Ward et al. |
| 2009/0143334 | A1 | 6/2009 | Ward et al. |
| 2010/0069488 | A1 | 3/2010 | Mabey et al. |
| 2010/0076098 | A1 | 3/2010 | Mabey et al. |

FOREIGN PATENT DOCUMENTS

| | | |
|---|---|---|
| WO | WO 96/00264 A1 | 1/1996 |
| WO | WO 02/10724 A1 | 2/2002 |
| WO | WO 02/13605 A2 | 2/2002 |
| WO | WO 02/052935 A2 | 7/2002 |
| WO | WO 2004/067507 A2 | 8/2004 |
| WO | WO 2006/127016 A1 | 11/2006 |

OTHER PUBLICATIONS

U.S. Appl. No. 61/269,981, filed Jul. 1, 2009 A.D., by Wm. Kish.
U.S. Appl. No. 61/270,861, filed Jul. 14, 2009 A.D., by Wm. Kish.
U.S. Appl. No. 61/273,614, filed Aug. 6, 2009 A.D., by M.J. Mabey and Wm. Kish.
No-Burn, Inc., Intumescent Fire Retardant Point, AIA Cout. Ed., Mold Resist. . . , 2007-2010 (noburn.com) Jul. 16, 2010, 2 pp.
No-Burn, Inc., Intumescent Fire Retardant Point, Applied Fire Resistance, AIA Continuin. . . , 2007-2010 (noburn.com) Jul. 16, 2010, 3 pp.
USPTO Tess (Tru-Core) [COMB], Record List Display (1/1); 78440476 (2 pp.) ; 77506243 ® 3567563 (2 pp.) ; and 75213678 ® 2173844 (2 pp.)—downloaded/printed Jun. 30, 2009.
RPM International Inc., Letters to the Editor, Chuck Pauli, Pittsburgh, "RPM II's Innovation to Value, " printed Jun. 24, 2009 from e-mail of Jun. 23, 2009.
WIPO Patentscope Search For: (PA/"Kop-Coat, Inc."), Jun. 30, 2009, 2 pp., citing 6 records.

(Continued)

Primary Examiner — Terressa Boykin
(74) Attorney, Agent, or Firm — Christopher John Rudy

(57) ABSTRACT

An ammonium phosphate containing fire retardant is combined with a fluoropolymer and/or a penetrating barrier, borate-containing formulation having resistance to water damage with protective properties coming from materials such as used in food packaging and cosmetics and/or a medium-to-long chain polar carboxyl substance, and/or a medium-to-long chain polar carboxyl substance without borate, so as to make a composition. The composition can be aqueous. It can be a liquid of light to moderate viscosity, or may be a concentrated or dried version, which may contain a neutral ammonium phosphate and perhaps other ingredient(s) such as a mold inhibitor, an insecticide, a stain protector, and so forth and the like. The mold inhibitor can have especial activity against toxic black mold (*Stachybotrys chartarum*). The insecticide may be a termiticide. Such a composition can be made by contacting the fire retardant and other necessary ingredient(s) under conditions sufficient to form the composition; it can be used by contacting it with a substrate, which beneficially is otherwise flammable. A process for incorporation of an ammonium phosphate containing fire retardant into wood includes contacting the wood with a liquid at an effective pH above the pH of the wood, where the liquid embraces a combination in proximity or time of an amine oxide and a buffering agent, as well as the ammonium phosphate containing fire retardant, under conditions such that the ammonium phosphate containing fire retardant is incorporated into the wood. Another aspect is the composition or its residue in combination with the substrate.

20 Claims, No Drawings

OTHER PUBLICATIONS

ASTM E84 REVB/IHS, Industry Standards & Regulations, Nov. 1, 2010, 1 p., printed May 19, 2011.
CBD-141, Nat'l Res. Council Canada; Flammability of Living and Insulating Materials.
USPTO Tess ((DRIWRAP)[COMB]) Record 1 out of 1, DRIWRAP ® 2744198 (Jul. 29, 2003). printed May 19, 2011.
Ross, A., "New Penetrating Barrier Treatment for Wood and Wood Composites, " Proceedings of the American Wood-Preservers Association, Austin, TX, Apr. 9-11, 2006, vol. 102, 10pp.
Ross, A., "Coatings for Millwork Components," May 2004, Kop-Coat, Inc., 3 pp.
Forest Products Society, Madison, WI, Biographies & Abstracts, Enhancing the Durability of Lumber & Engineered Wood Products, Feb. 11-13, 2002, Kissimmee, FL, 24 pp.
Kop-Coat Wood Protection Products, Kiln-Dried Lumber, www.kop-coat/kilndried.asp, 2009, printed Jul. 9, 2009, 1 p.
Kop-Coat New Zealand Protection Programmes, 2007, Kop-Coat New Zealand LTD., 2 pp., printed Jun. 24, 2009 from e-mail of Jun. 23, 2009.
Kop-Coat, Inc., Technical Bulletin: 2002-3, A guide to sawmill applied lumber chemicals which resist mold and protect against water damage. . . , Aug. 20, 2002, 2 pp.
THOMPSON'S®, Product Details, FAQs, Solutions, . . . Water Seal and One Coat Seal Ultra? 2007 printed Aug. 5, 2009.
THOMPSON's®, Product Data Sheet, Water Seal, Mar. 2008, No. 11018, Issue 4, 3 pp.
ARKEMA, MSDS, KYNAR® Homopolymers, May 27, 2008, ARKEMA Canada Inc., Oakville, Ontario, 3 pp.
Structural Processing Corporation, The National Zoo, Kynar 500 ® (polyvinylidone fluride) . . . , 2004, printed May 9, 2008.
Arkema, MSDS, Kynar (R) 500-PWD PVDF, Aug. 19, 2005, Arkema Inc., Philadelphia, Pa., 7 pp. (4 sheets) MSDS.
Arkema, Introducing Kynar Aquatec™, 2007, Arkema, Inc., Philadelphia, Pa., 4 pp.
Arkema, Kynar Aquatec™ ARC MSDS, Jun. 28, 2007, Arkema Canada Inc., 4 pp.
EFRA (European Flame Retardants Association), Flame Retardants Fact Sheet, Melamine Phosphates, www.cefic-efra.eu, 3 pp., Jan. 2007.
Solvay S.A., Hylar® 5000, www.solvayexis.com, Jul. 11, 2008 printed Sep. 17, 2008, 1 p.
Wikipedia, Calcium Stearate, Jul. 5, 2009, printed Aug. 6, 2009, 1 p.
Wikipedia, Magnesium Stearate, Jul. 31, 2009, printed Aug. 6, 2009, 1 p.
Wikipedia, Stearic acid, Jul. 24, 2009, printed Aug. 6, 2009, 3 pp.
The Dow Chemical Company, Dowanol DPM, Product Infurmation, Mar. 2004, 2 pp.
Eliokem Inc., Akron, Ohio, Products—coating resins (www.eliokem.com), 2003, 1 p. printed Oct. 23, 2008.
Eliokem Inc., Akron, Ohio Coatings (www.eliokem.com). 2003, 1 p., d-load Oct. 23, 2008.
Eliokem Inc., Akron, Ohio, Pliolite® Resins (www.eliokem.com), 2003, 1 p., downloaded Oct. 23, 2008.
Eliokem Inc., Akron, Ohio, Pliolite® AC80 Resin, Product Data Sheet, Mar. 2007. 1 p.
Eliokem Inc., Akron, Ohio, Pliolite® AC4 Resin, Product Data Sheet, Apr. 2006, 1 p.
Eliokem Inc., Akron, Ohio, Pliolite® AC5G Resin, Product Data Sheet, Mar. 2007, 1 p.
Eliokem Inc., Akron, Ohio, Pliolite® AC/ACL Resin, Product Data Sheet, date unk., 1 p.
Eliokem Inc.. Akron, Ohio, Pliolite® VTAC Resin, Product Data Sheet, Mar. 2007, 1 p.
Eliokem Inc., Akron, Ohio, Pliolite® VTAC-L Resin, Product Data Sheet, Mar. 2007. 1 p.
Eliokem Inc., Akron, Ohio, Pliolite® AC3-H Resin, Product Data Sheet, Mar. 2007, 1 p.
Eliokem Inc., Akron, Ohio, Pliolite® VTAC-H Resin, Product Data Sheet. Mar. 2007, 1 p.
Eliokem Inc., Akron, Ohio, Pliolite® S5AB & S5E Resin, Product Data Sheet. Apr. 2006, 1 p.
Eliokem Inc., Akron, Ohio, Pliolite® ULTRA 100 Resin, Product Data Sheet, Mar. 2007, 1 p.
Eliokem Inc., Akron, Ohio, Pliolite® LV72 Resin, Product Data Sheet, May 2006, 1 p.
Eliokem Inc., Akron, Ohio, Pliolite® LV15S Resin, Product Data Sheet, Sep. 2007, 1 p.
Eliokem Inc., Akron, Ohio, Plioway® Resins (www.eliokem.com), 2003, 1 p., downloaded Oct. 23, 2008.
Eliokem Inc., Akron, Ohio, Plioway® ULTRA 200 Resin, Product Data Sheet, Mar. 2007, 1 p.
Eliokem Inc., Akron, Ohio. Plioway® ULTRA G20 Resin, Product Data Sheet, Mar. 2008, 1 p.
Eliokem Inc., Akron, Ohio, Plioway® ULTRA 350LV Resin, Product Data Sheet Apr. 2006, 1 p.
Eliokem Inc., Akron, Ohio, Plioway® EC1 Resin, Product Data Sheet, Mar. 2007 1 p.
Eliokem Inc., Akron, Ohio, Plioway® ECT Resin, Product Data Sheet. Mar. 2007, 1 p.
SpecialChem S.A., Chlorowax® 60-70 from ICC Industries—Dover (www.specialchem4coatings.com). 2008, 1 p., downloaded Oct. 16, 2008.
SpecialChem S.A., Chlorowax® 70-200 from ICC Industries—Dover (www.specialchem4coatings.com), 2008, 1 p., downloaded Oct. 16, 2008.
Dover Chemical Corporation, Dover, Ohio Products (www.dover.com), Chlorez®/-Hordaresin® Resinous Chlorinated Paraffins, 2008, 1 p., downloaded Oct. 16, 2008.
Dover Chemical Corporation, Dover, Ohio, Products (www.dover.com), Doversperse Water Dispersed Chlorinated Paraffins, 2008, 1 p., downloaded Oct. 16, 2008.
Dover Chemical Corporation, Dover, Ohio, "Dover Products Add Performance and Cut Formulation Costs " Technical Bulletin Jan. 1-2, 2002, 1 p.
Clariant, Pigments & Additives Division, Flame Retardants: Exolit AP 422 Ammonium Polyphosphate (pa.clariant.com), Sep. 13, 2007, 3 pp., downloaded Oct. 16, 2008.
INEOS Melamines, Inc., Marietta, Georgia, , Resimene® AQ-7550 resin, Technical Data Sheet, Apr. 2007, 2 pp.
Cytec Industries Inc. W. Patterson N.J., CYMEL® 303 crosslinking agents, 2000, 2 pp.

US 8,344,055 B1

AMMONIUM PHOSPHATE FIRE RETARDANT WITH WATER RESISTANCE

This claims the benefits under 35 USC 119(e) of provisional Nos. U.S. 61/269,981 filed on Jul. 1, 2009 A.D., U.S. 61/270,861 filed on Jul. 14, 2009 A.D., and U.S. 61/273,614 filed on Aug. 6, 2009 A.D. The specifications of those applications are incorporated herein by reference in their entireties.

FIELD AND PURVIEW OF THE INVENTION

This concerns and provides a composition embracing an ammonium phosphate containing fire retardant combined with a fluoropolymer, a penetrating barrier, borate-containing formulation having resistance to water damage with protective properties coming from materials such as used in food packaging and cosmetics and/or a medium-to-long chain polar carboxyl substance, an illustration of which is a stearate. The composition can be a liquid of light to moderate viscosity to include a liquid of a viscosity between light and moderate to moderate (or may be a concentrated or dried version thereof) that may contain a neutral ammonium phosphate and perhaps other ingredient(s) such as a mold inhibitor, an insecticide, a stain protector, and so forth. Methods to make and use the composition are of concern. The composition can be used with, for example, wood, which includes processed wood products, and other cellulosics, which can include paper, cardboard, and natural fibers such as of cotton, linen, hemp, bamboo and so forth and the like. The treated material is also of concern.

BACKGROUND TO THE INVENTION

A justifiably high priority is given to protection of combustible materials such as wood, processed wood products, which may include plywood, oriented strain board, chipboard, masonite, and paper, cardboard, textiles and fabrics, and so forth and the like.

Various fire retardant compositions and systems to effect such protection are known. For example, No-Burn, Inc., Wadsworth, Ohio, makes available a number of fire retardant formulations that include an ammonium phosphate such as NO-BURN® Original™, NO-BURN® Wood Gard™, NO-BURN® PLUS™, NO-BURN® Fabric Fire Gard™ products, which may or may not also include a mold inhibitor, an insecticide, or perhaps a stain repellant. Compare, U.S. Pat. No. 6,982,049 B1, U.S. Pat. No. 6,989,113 B1, U.S. Pat. No. 7,482,395 B2 and U.S. Pat. No. 7,587,875 B2; and patent application Pub. Nos. US 2005/0022466 A1, US 2006/0189232 A1, US 2007/0170404 A1, US 2007/0176156 A1, US 2007/0185238 A1 and US 2008/0054230 A1. See also, U.S. Pat. No. 6,811,731 B2, which discloses a method of incorporating phosphate/borate fire retardant compositions into wood based composite products, and U.S. Pat. No. 4,725,382 for fire retardant compositions, both assigned to Chemical Specialties, Inc., Charlotte, N.C.

On the other hand, various processes are known for incorporating preservatives or insecticides into wood. Among these is the TRU-CORE® process for protecting wood products of Kop-Coat, Inc., Pittsburgh, Pa., which can deliver preservation ingredients to the center core of lumber products without the expensive traditional use of pressure treatments. Compare, patent application publication No. WO 2006/127016 A1. See also, patent application Pub. Nos. US 2006/0269677 A1, US 2009/0088481 A1 and US 2009/0143334 A1. Other treatments exist, for example, for lumber, which is, of course, flammable. Many of these do not primarily concern fire retardant capability although some fire retardant capability may be provided with penetrating barrier, borate-based formulations, for one example, a Class B ASTM E-84-05 rating. Among these is DRIWRAP® coating material for wood and wood-based composites. It is a spray-applied thin coating, which combines water and mold resistance, is breathable and resistant to water damage, contains a preservative that creates a barrier that is resistant to mold, and has its protective properties coming from materials that are used in food packaging and cosmetics. Compare, U.S. Pat. No. 5,468,284 and U.S. Pat. No. 6,416,789 B1 and U.S. Pat. No. 6,582,732 B1. Note, patent application publication No. WO 2006/127016 A1; and Pub. Nos. US 2006/0269677 A1, US 2009/0088481 A1 and US 2009/0143334 A1. See also, Ross, A., "New Penetrating Barrier Treatment for Wood and Wood Composites," *Proceedings of the American Wood-Preservers' Association*, Austin, Tx., Apr. 9-11, 2006; Kop-Coat Wood Protection Products, Kiln-Dried Lumber (www.kopcoat.com/kilndried.asp), 2009.

Other products may provide water resistance. For example, although not a fire retardant, Thompson's Water Seal product is a solvent-borne, stearate-based water proofer for a variety of surfaces including wood, but not plywood, and other porous surfaces.

Various conventional paints and paint formulation bases may have long lasting color retention, chalk resistance, stain resistance, etc. Among these, for example, are touted various formulations that are or are made to include a polyvinylidene fluoride resin such as a KYNAR® resin as in a KYNAR 301F, 500, 710, 741F or 9301 or KYNAR AQUATEC product. Compare, U.S. Pat. No. 6,635,714 B1 and U.S. Pat. No. 7,037,966 B2. See also, U.S. Pat. No. 6,833,414 B2.

It would be desirable to improve the fire retardant art. It would be desirable to provide alternative(s) to the art. Trade literature notwithstanding, formulation and compatibility may not always be straightforward.

A FULL DISCLOSURE OF THE INVENTION

In general, provided is a composition comprising an ammonium phosphate containing fire retardant in combination with a fluoropolymer and/or a penetrating barrier, borate-containing formulation having resistance to water damage with protective properties coming from materials such as used in food packaging and cosmetics and/or a medium-to-long chain polar carboxyl substance, and/or a medium-to-long chain polar carboxyl substance without borate. The composition can be aqueous. The composition can be a liquid of light to moderate viscosity to include a liquid of a viscosity between light and moderate to moderate, or may be a concentrated or dried version thereof, which may contain a neutral ammonium phosphate and perhaps other ingredient(s) such as a mold inhibitor, an insecticide, a stain protector, and so forth and the like. The mold inhibitor can have, for example, especial activity against toxic black mold (*Stachybotrys chartarum*). The insecticide may be, for example, a termiticide. Such a composition can be made by contacting a fire retardant, optionally with another active agent, with the fluoropolymer and/or penetrating barrier, borate-containing formulation under conditions sufficient to form the composition; it can be used by contacting it with a substrate, which beneficially is otherwise flammable. Provided hereby also is a process for incorporation of an ammonium phosphate containing fire retardant into wood, which comprises contacting the wood with a liquid at an effective pH above the pH of the wood, where the liquid embraces a combination in proximity or time of an amine oxide and a buffering agent, as well as the ammonium phosphate containing fire retardant, under conditions such that the ammonium phosphate containing fire retardant is incorporated into the wood. Another aspect is the composition or its residue in combination with the substrate. And so, wood having the ammonium phosphate containing fire retardant incorporated therein is thus provided.

The invention is useful in fire retardant technology. It can be employed in protecting building structures, their contents and/or their occupants, in general, from fire, optionally mold or insect damage or annoyance, and so forth.

Significantly, by the invention, the art is advanced in kind, and at least one alternative is provided the art. Hereby, an ammonium phosphate containing fire retardant surprisingly can be readily incorporated into the wood, and nearly if not entirely complete penetration into the wood can be effected. Results may be comparable to or even better than that found with the wood preservatives used in the practice of the TRU-CORE® process for protecting wood products, or in WO 2006/127016 A1, US 2006/0269677 A1, US 2009/0088481 A1 or US 2009/0143334 A1. Pressure and vacuum treatments, and so forth can be avoided. An effective, cost-efficient, aesthetically pleasing and/or generally safe fire retardant providing long-lasting protection and overall durability is provided. Water resistance may be significant. Other active agents can provide protection from mold, notably *Stachybotrys chartarum*, i.e., toxic black mold; insects, notably termites and so forth; and/or stains, notably from soil and so forth. Thus, for example, flammable construction stock such as of wood can be provided with good fire retardant capability and effective control of termites as well as toxic black mold. Fabrics may also be provided stain resistance in addition to fire retardant capability, and optionally mold and/or insect protection. Application of the composition is simple and easy, and coverage can be excellent. The composition can advantageously be applied directly to a wide range of materials, including wood, plywood, oriented strand board and chip board sheathing, paper, fabrics, corrugated board materials, and so forth and the like. It is efficient and reasonably safe to manufacture, store, transport and use. One of the many advantages of the present composition is that, since it can be applied directly to building materials before or on site, it greatly reduces financial and environmental costs in new structures of rendering materials fire retardant and termite resistant. Further, building materials may be rendered fire retardant and optionally mold- and/or termite-repellant and so forth after construction by application of the present composition. In a particular embodiment, the composition may be considered to be a highly durable, liquid of moderate viscosity to a viscosity between light and moderate (or may be a concentrated or dried version thereof) that contains a neutral ammonium phosphate and perhaps other ingredient(s) such as a mold inhibitor, an insecticide, and so forth, which can provide these properties at once through a common application of a beautiful and highly durable liquid coating. The composition may provide for a "Class A" flame spread rating under the ASTM-E84 test.

Numerous further advantages attend the invention.

The invention can be further understood by the detail set forth below. As with the foregoing, such is to be taken in an illustrative and not necessarily limiting sense.

Broadly, in one embodiment, an ammonium phosphate containing fire retardant is combined with a fluoropolymer, a penetrating barrier, borate-containing formulation having resistance to water damage with protective properties coming from materials used in food packaging and cosmetics, and/or a medium-to-long chain polar carboxyl substance. An intumescent fire retardant coating, which may be an aqueous based transparent or translucent ammonium phosphate containing coating, may include the fluoropolymer, penetrating barrier, borate-containing formulation having resistance to water damage with protective properties coming from materials used in food packaging and cosmetics, and/or stearate. A mold inhibitor, insecticide, stain repellant and/or other active agent may be combined therewith. The present composition may be in a form that is not a paint or latex paint.

The term, "fire retardant," herein can refer to an ingredient for a composition or to the composition, which may be a coating, which may be a top coating and/or a penetrating coating, which, when applied to a flammable material, provides thermal protection for the material. In general, this may be done by reducing or perhaps even eliminating the tendency of the material to burn and/or reducing the rate of flame spread along the surface of the material. Preferably, use of the fire retardant composition, for example, on a solid material as the substrate, reduces surface burning characteristics significantly, say, at least about 10%, at least about 25%, or at least about 50%, when compared to untreated material, as tested by an appropriate test. For example, the test may be the ASTM E-84 Steiner Tunnel Test.

Any suitable ammonium phosphate containing fire retardant ingredient is employed. The ammonium phosphate may embrace a mono- and/or di-ammonium phosphate, a polyphosphate, and so forth and the like. For instance, it may be or include an ammonium polyphosphate and be in a form of a liquid of light to moderate viscosity to include of a moderate viscosity to a viscosity between light and moderate (or may be a concentrated or dried version thereof) that may contain a neutral ammonium phosphate and perhaps other ingredient(s) such as a mold inhibitor, an insecticide, a stain repellant and so forth and the like, which, for example, can be a fire retardant formulation that includes an ammonium phosphate such as NO-BURN® Original™, NO-BURN® Wood Gard™, and/or NO-BURN® Fabric Fire Gard™ product(s), which may or may not also include a mold inhibitor, an insecticide and/or or a stain repellant. Compare, U.S. Pat. No. 6,982,049 B1, U.S. Pat. No. 6,989,113 B1 and U.S. Pat. No. 7,587,875 B2 (e.g., Form #1, Form #3 and/or Form #4 agents); and patent application Pub. Nos. US 2006/0189232 A1, US 2007/0170404 A1 and US 2007/0176156 A1—each of which patents and patent application publications is incorporated herein by reference in its entirety, to include drawings.

Any suitable other fire retardant ingredient may also be employed. For instance, such an other fire retardant ingredient may be a borate, an organic halide such as a chloride or generally more effectively a bromide or combination of chloride and bromide, an organophosphorus compound, which may be an organic phosphate, to include melamine phosphates such as melamine phosphate, melamine orthophosphate, dimelamine phosphate, dimelamine orthophosphate, melamine pyrophosphate, melamine polyphosphate, blends therewith, and so forth. Melamine and/or melamine cyanyurate may be employed.

A "fluoropolymer" is an organic polymer which contains fluorine moieties. Any suitable fluoropolymer may be employed. For instance, the fluoropolymer may embrace, in general, a fluoropolymer homopolymer, for instance, polyvinylidene fluoride (PVDF) and/or a copolymer or modified fluoropolymer, for instance, a fluoropolymer-acrylic blend including those known in the art as an acrylic-modified fluoropolymer (AMF), which can include a lower alkyl (meth) acrylate such as methyl, ethyl and/or propyl, butyl and higher (meth)acrylate(s) and so forth; a copolymer of vinylidene fluoride (VDF) and a perhalogenated monomer such as hexafluoropropylene (HFP), chlorotetrafluoroethylene (CTFE) or tetrafluoroethylene (TFE). Other acrylic component monomers for copolymerization may include methacrylic or itaconic acid, hydroxyethyl acrylate or methacrylate, carbonyl or acetoacetate functional monomers, various alkoxysilane methacrylates or acrylates, vinyl esters, vinyl ethers, and styrene. A latex dispersion may employ a fluoropolymer having little or no detectable crystalline melting peak. See, e.g., U.S. Pat. No. 6,635,714 B1. A KYNAR® AQUATEC emulsion may be employed for a water-based composition. A KYNAR® 500 PVDF product and/or a Solvay Solexis Hylar® 5000 PVDF product, for instance, perhaps may be employed for a solvent based, also known as "oil based," composition, which employs a volatile organic compound as a vehicle. Any suitable amount may be employed.

Any suitable penetrating barrier, borate-containing formulation having resistance to water damage with protective properties coming from materials used in food packaging and cosmetics can be employed. For example, such a formulation can embrace the DRIWRAP® coating material for wood and wood-based composites, which is a spray-applied thin coating that combines water and mold resistance, is breathable and resistant to water damage, contains a preservative that creates a barrier that is resistant to mold, and has its protective properties coming from materials that are used in food packaging and cosmetics. The DRIWRAP® coating material for wood and wood-based composites is commercially available from Kop-Coat, Inc. See, U.S. Pat. No. 5,468,284 and U.S. Pat. No. 6,416,789 B1 and U.S. Pat. No. 6,582,732 B1. See also, patent application publication No. WO 2006/127016 A1; and Pub. Nos. US 2006/0269677 A1, US 2009/0088481 A1 and US 2009/0143334 A1. Any suitable amount may be employed.

Any suitable medium-to-long chain polar carboxyl substance may be employed. It may be a carboxylic acid, ester or salt of a carboxylic acid, for instance, as a metal salt. The valence of the metal or other cation in the substance may be two or more. This substance may be a stearate, which, for example, may be or include aluminum stearate. A mixture of two or more different medium-to-long chain polar carboxyl substances may be employed. This substance, when considered as a pure compound, may accord with the following general formula:

(R—COO)$_m$-M wherein:
"R" is, independently at each occurrence, an aliphatic moiety of about from ten to thirty carbons, to include about from twelve to twenty-five, to include about from fifteen to twenty; the aliphatic moiety, independently at each occurrence, may be saturated or unsaturated, for instance, being alkyl;
"m" is a suitable number, say, an integer of 1 or greater, to include 2 or greater, to include 3 or greater, and which, for example, may be 2 or 3; and
"M" is, independently at each occurrence, H so as to make an acid provided that "m" is 1; an organic ester moiety say, to make an ester; and/or or a metal with a valence of "m," say, to make a salt, examples of which may include Al, Ca, Mg, Zn and so forth and the like.

Any suitable amount of the medium-to-long chain polar carboxyl substance may be employed.

The ingredients of the composition may be combined in any suitable manner. A simple expedient, for example, can be by top coating a fire retardant composition that resides on a substrate with a coating of the present composition over an intumescent fire retardant paint such as NO-BURN® PLUS latex paint on siding, under eaves, or other substrate or portion of a structure. Another embodiment can be the mixing of fire retardant and fluoropolymer, penetrating barrier, borate-containing formulation having resistance to water damage with protective properties coming from materials used in food packaging and cosmetics, and/or medium-to-long chain polar carboxyl substance into one mixture, for example, a liquid coating. The latter may be accomplished, for example, by the addition of KYNAR® AQUATEC liquid and/or DRIWRAP® coating material for wood and wood-based composites and/or aluminum stearate to NO-BURN® Original™, NO-BURN® Wood Gard™, and/or NO-BURN® Fabric Fire Gard™ product(s), which may or may not have a mold inhibitor, an insecticide and/or a stain repellant.

Ammonium phosphate fire retardant plus fluoropolymer, penetrating barrier, borate-containing formulation having resistance to water damage with protective properties coming from materials used in food packaging and cosmetics, and/or medium-to-long chain polar carboxyl substance containing formulations can vary. An aqueous formulation may include ingredients added with water in percentages, which may be considered approximate, and, of course, which would be selected to total 100%:

| | |
|---|---|
| Mono/diammonium phosphate(s) | 20~70% |
| Diluent, e.g., solvent, say, water | 25~50% |
| Spumific, e.g., urea beads | 2.5~15.0% |
| Sugar, e.g., glucose | 4.0~12.0% |
| Polysaccharide resin | 2.0~40.0% |
| Added surfactant, e.g., GLUCOPON-425 | 0.2~1.2%, advantageously none |
| Added defoaming agent, e.g., potassium salicylate in solution | 0% or 0.01~0.1% or 0.01~0.5% |
| Mold inhibitor, e.g., diDe-diMe-AmCl | 0% or 0.1~10%, to include 0.5~5.5% |
| Insecticide, e.g., permethrin | 0% or 0.1~5% |
| Fluoropolymer latex resin, e.g., fluoropolymer acrylic type | *0% or, say, 3~30% |
| Penetrating barrier, borate-containing formulation having resistance to water damage with protective properties coming from materials used in food packaging and cosmetics, e.g., DRIWRAP ® coating material | *0% or, say, 1~70% |
| Medium-to-long chain polar carboxyl substance, e.g., aluminum stearate | *0% or, say, 0.1~20% *At least some present from among these three ingredients collectively. |

As a more detailed or preferred formulation to the preferred formula listed above, or as another manner of expressing such, typical amounts as percents by weight (unless otherwise specified or known from context or art) of components effective in the practice of the invention are listed as follows, again, of which any specified components or characteristics are exemplary and for purposes of illustration, and which listed amounts may be taken as precise or approximate, and again which would be selected to total 100%:

| | |
|---|---|
| Ammonium orthophosphate (40% aqueous solution) | 50~70% |
| Polysaccharide resin, e.g., Lorama LPR76 (45% aqueous solution) | 20~30% |
| Sugar, e.g., granulated cane sugar | 5~10% |
| Spumific, e.g., urea | 5~7% |
| Added defoaming agent, e.g., potassium salicylate in solution | 0% or 0.01~0.1/0.5% |

| | |
|---|---|
| Mold inhibitor, e.g., Alk-diMe-Bz-AmCl (80% aqueous solution) | 0% or 0.5~5% |
| Termiticide, e.g., as "Permanone 90" 90% permethrin | 0% or 0.5~3% |
| Fluoropolymer latex resin, e.g., fluoropolymer acrylic type | *0% or, say, 3~30% |
| Penetrating barrier, borate-containing formulation having resistance to water damage with protective properties coming from materials used in food packaging and cosmetics, e.g., DRIWRAP ® coating material | *0% or, say, 1~70% |
| Medium-to-long chain polar carboxyl substance, e.g., aluminum stearate | *0% or, say, 0.1~20% *At least some present from among these three ingredients collectively. |

These ingredients may be stirred until dissolved, making a mixture free of solids and forming a clear liquid with pH, say, about 6.8. However, the mixture may be slightly cloudy or even in some cases more cloudy, or with strata in some cases, yet be effective and appealing.

It is to be understood, however, that many suitable materials may be used as the fire retardant with insecticide, optionally with mold inhibiting, insecticidal, stain repelling or other agent(s), portion of the present composition. In one embodiment, the fire retardant compound can be made from a combination of mono and diammonium phosphate salts formed from reacting about from 75% to 85% solutions of phosphoric acid ($H_3PO_4$) with aqueous ammonia ($NH_4$) in sufficient stoichiometric ratios to produce a generally pH neutral solution, and then further reacting the carbon rich material as above and the nitrogen rich urea to form a viscous liquid. To this mixture is added the wetting and defoaming agents mentioned earlier. While this composition is fresh, and still warm, the optional mold inhibitor and/or insecticide can be added. Each of the starting compounds to make such an embodiment is commercially available. The mixture is stirred, say, to dissolve the ingredients and provide a clear solution. Strata may appear. The mixture can be stirred again before application.

As an aqueous solution, the pH of ammonium phosphate containing fire retardant ingredient can be approximately neutral, for instance, about from five and one half to eight, say, about from six to seven and a half, preferably about from 6 to 7, more preferably and independently at each occurrence about from 6.2 or 6.6 to 6.8 or 6.9. Along these lines, in general, too high a pH, say, above 6.8 or so, may release a discernable ammonia smell with the preferred product, and too low a pH, say, below 6.6 or so, may engender corrosion on certain substrates with which the product comes into contact. The ammonium phosphate containing fire retardant ingredient may have any suitable density or specific gravity, for instance, about from one to one and a half, say about from one and a tenth to one and a third. The specific density may be about from 1.1 to 1.3. Active fire retardant composition component ingredients, less the optional mold inhibitor and/or insecticide, may be present in any amount, to include about from 40% to 60%, which includes about from 45% to 55%, say, about from 47% to 50%, of the total weight of the fire retardant formulation component of the invention. In terms of total weight percent of the ammonium phosphate containing fire retardant formulation, to include any added mold inhibitor and/or insecticide, the active ingredients can be present in any effective amount, to include about from 40% to 70%, which includes about from 45% to 55%.

A composition such as NO-BURN® Fire Gard (Fabric Fire Gard) fire retardant spray may be employed as a foundational formulation. Such is an example of a spray-on liquid of light viscosity and strength, which is an aqueous proprietary product with a formulation that can vary but that can include, in general, such ingredients, with percentages (%) by weight, as follows:

| | |
|---|---|
| Water | 70~90% to include 76~82% |
| Phosphorus containing acid, e.g., as polyphosphoric acid (115%) | 5~15% to include 10~12% |
| Ammonium base, e.g., as hydroxide (29% aqueous solution) | 5~15% to include 8~10% |
| Wetting and/or other agent such as coco amido-propyl betaine (30% aqueous solution) | 0.05~0.2% to include 0.09~0.13 % |
| Preservative, e.g., potassium salicylate | 0.01~0.1% to include 0.04~0.06%. |

To such a foundational formulation is provided the fluoropolymer, penetrating barrier, borate-containing formulation having resistance to water damage with protective properties coming from materials used in food packaging and cosmetics, and/or medium-to-long chain polar carboxyl substance. Such may be carried out after the foundational formulation is made as by addition and mixing and/or by including the necessary ingredient(s) with one or more of the ingredients to the foundational formulation, and contacting the same with the others, say, again, by addition and mixing.

Other additive(s) may be employed.

The term, "mold inhibitor," as employed herein is an agent that can kill, control, or prevent growth of mold, mildew, or fungus, and so forth and the like flora, especially when formulated with the present composition. A mold inhibitor may be fire retardant or fire accelerative, but, in the latter case, does not accelerate fire to a degree that the overall composition which contains the mold inhibitor cannot be considered to be a fire retardant composition. Preferably, however, use of the present composition when it has mold inhibitor, for example, on a solid material as the substrate, reduces growth of the flora of interest significantly, say, at least about 60%, at least about 85%, or at least about 99% or even at least about 99.9%, if it does not kill it outright, for a significant time, say, at least about thirty days, at least about six months, or at least about 360 days or a year, if not, in effect, indefinitely, as tested by appropriate test methodology. For example, the test method may be by ASTM D5590-94, Determination of Resistance of a Coating Material to Fungal Growth.

As the mold inhibitor, any suitable substance may be employed, alone or in combination with another mold inhibitor. Preferably, the mold inhibitor is compatible with the other components, and further is soluble or suspendable therewith. For instance, the mold inhibitor may be a quaternary organic ammonium halide, to include a quaternary alkyl ammonium halide, especially such a halide having at least one short chain and at least one medium chain alkyl group, for example, two of each, and an otherwise corresponding quaternary alkyl aromatic ammonium halide. The short chain alkyl group may be inclusive of, separately at each occurrence, a one- to an about five-carbon group, especially a one- to four-carbon group, for example, a methyl, ethyl, propyl, and so forth group. The medium chain alkyl group may be inclusive of, separately at each occurrence, an about six- to an about thirty-carbon group, especially a six- to an about twenty-carbon group, for example, hexyl, heptyl, octyl, nonyl, decyl, undecyl, dodecyl, a thirteen-, fourteen-, fifteen- or sixteen-, seventeen-, eighteen-, nineteen-, or twenty-carbon group, and so forth. Preferably, the short chain alkyl group is methyl and/or ethyl, especially methyl, and the medium chain alkyl group is an eight- to twelve-carbon group, to include a mixture thereof, especially decyl, which can be present as an n-alkyl group. The halide is advantageously a chloride. For example, the mold inhibitor may be diDe-diMe-AmCl (didecyldimethylammonium chloride). An aromatic group, to include aryl, alkaryl and/or arylalkyl, for example, a benzyl and/or ethylbenzyl group may be present, for instance, in a quaternary organic to include a quaternary alkyl aromatic ammonium halide mold inhibitor, for example, Alk-diMe-Bz-AmCl (alkyldimethylbenzylammonium chloride). The mold inhibitor may be a mixture containing more than one mold inhibitor compound. An increase in concentration of any quaternary ammonium halide mold inhibitor may provide for a corresponding reduction in the amount of ammonium phosphate or ammonium orthophosphate.

Any suitable amount of the mold inhibitor may be employed. The amount may be any that is sufficient to kill, control, or prevent growth of mold, mildew, or fungus, and so forth and the like flora, when the composition is applied to, and preferably dried on or in, a substrate. The insecticide may be, independently at each occurrence, say, from 0.01% to 50% by weight of total composition, say, from 0.1%, 1%, or 2% to 4%, 5% or 10%, for instance, 3%, by weight of the total composition.

The term, "insecticide," is an agent that can kill, control and/or repel a target invertebrate. The target invertebrate can be an insect per se, for example, a termite, a carpenter, sweet or grease eating ant, a bee, hornet or wasp, a roach, a fly, a mosquito, a cricket, an earwig, a silverfish, a tick, a flea, a beetle, and so forth; another arthropod such as a spider, a centipede, and so forth; and/or a worm or even a snail or slug, and so forth. Target invertebrates considered building pests, which could include the termites, ants, bees, hornets and wasps, roaches, crickets, earwigs, silverfish, fleas, beetles, and spiders, especially termites, desirably are killed, controlled and/or repelled hereby.

Any suitable insecticide can be employed in the practice of the present invention, alone or in combination with another insecticide. Preferably, the insecticide is soluble or otherwise able to be carried with the remaining ingredients of the present composition such as by dispersion, emulsion, and so forth, and preferably does not hinder any solubility or otherwise any capacity for being carried likewise of other ingredients of the composition. Preferably, too, the insecticide does not alter, at least significantly, other desirable physical characteristic(s) of the composition that would otherwise exist without it such as, for example, pH, viscosity, and so forth. Preferably also, the insecticide is stable in the composition before, i.e., "in the can," and after application to the substrate, so as to provide for contact with the target invertebrate. An insecticide may be fire retardant or fire accelerative, but, in the latter case, does not accelerate fire to a degree that the overall composition which contains the insecticide cannot be considered to be a fire retardant composition. Preferably, the insecticide, when applied to a suitable substrate in a suitable amount, provides measurable protection to the substrate from the target invertebrate(s). The measurable protection may be tested by a standard protocol. For example, with the substrate wood and the target invertebrate a termite, the protection may be measured by the American Wood-Preservers' Association Standard E1-97 protocol. Be that as it may, the insecticide may be or include inorganic, organic, natural and/or synthetic components, thus perhaps being or including Arsenic, Lead, Mercury, Thallium, or a compound of such, Phosphorus, an organophosphate, Sulfur, an organothio compound, a chlorinated organic compound, a pyrethroid, carbamide, carbimide, cyclopropanecarboxylate, a pyrethrin, and/or a piperonyl ether; examples may include, malathion, parathion, diazinon (0,0-diethyl-0,2-isopropyl-6-methyl(pyrinodine-4-yl)phosphorthioate), permethrin ((3-phenoxyphenyl)methyl(±)cis-trans-3-(2,2-dichloroethenyl)-2,2-dimethylcyclopropanecarboxylate) or CAS No. 52645-53-1), resmethrin, d-trans-allethrin, pralletherin, tetramethrin ((1-cyclohexene-1,2-dicarboximide)methyl-2,2-dimethyl-3-(2-methylpropenyl) cyclopropanecarboxylate), sumithrin (3-phenoxybenzyl-(1RS,3RS;1RS,3SR)-2,2-dimethyl-3-(2-methylprop-1-enyl) cyclopropanecarboxylate), lambda cyhalothrin, piperonyl butoxide and butylcarbityl(6-propylpiperonyl)ether, aldrin, chlorodane, dieldrin, endrin, heptachlor, lindane, DDT, DEET, nicotine, rotenone, pyrethrum, azadirachtin, oxalic acid, borax (sodium tetraborate decahydrate), disodium octaborate tetrahydrate, arsenic trioxide, lead arsenate, thallium sulfate, others, and so forth and the like. Among these, permethrin, for instance, is an effective termiticide, and, among its other benefits, it also may be considered to have termite feeding inhibiting properties. It is available from many sources. For example, it may be found commercially available in "Permanone 40" or Permanone 90" (Aventis Environmental Science), with concentrations indicated by the numerals, "40" or "90," which represent the percents by weight of active ingredients in solution.

Any suitable amount of the insecticide may be employed. The amount may be any that is sufficient to kill, control and/or repel a target invertebrate when the composition is applied to, and preferably dried on or in, a substrate. The insecticide may be, independently at each occurrence, say, from 0.01% to 50% by weight of total composition, say, from 0.1% or 1% to 3%, 5% or 10% by weight of the total composition. Such values may be considered to be approximate or precise. Especially when embodied as a termiticide, the insecticide may be added in an amount by weight of the base fire retardant and fluoropolymer composition, independently at each occurrence, say, at about from 0.5% to 10%, to include about from 0.5%, 0.75% or 1% to 1.5%, 2%, 3%, 4% or 5%. For instance, the termiticide may be added at about from 0.75% to 1.5%, say, about 0.8% to 1%, for example, about 0.9%, by weight of the base fire retardant with fluoropolymer latex paint formulation with or without mold inhibitor.

Any suitable stain protectant may be employed. A fluoropolymer stain protectant may be employed, for example, a fluoroaliphaticpolyacrylate fluoropolymer, which is commercially obtainable as Masurf FP-815 CP (16% active ingredient) from Mason Chemical. Another stain protectant that may be employed, for example, is Repel-O-Tex product from Rhone-Poulenc.

The stain protectant may be added in any suitable amount. It may be added in an amount by weight of base fire retardant foundation, independently at each occurrence, about from 0.1% to 5%, to include about from 0.2% to 1% or 2%, and about from 0.25% to 0.75%, by weight. The stain protectant may be added at about 0.5% by weight of the base fire retardant foundation.

The present composition may penetrate a substrate. It may reside substantially on the surface of the substrate. However that may be, once dried, it may leave a film on the surface of a solid substrate, which otherwise may be flammable, even though more than one coat may be needed to cover completely. There may be nothing in the composition of the present invention known to be substantially harmful to wood per se, plywood, any other wood product, or the paper of gypsum board, in general, even with penetration of the composition.

The present composition may be applied to the materials by any suitable method. Known methods may be employed. The composition may be applied by spraying, say, by handheld trigger sprayers, pump-up pressure sprayers, or any other type of manual or automatic power-assisted spraying apparatus, including by power paint rollers (saturated rollers); airless sprayers; brushing; dipping; and so forth. Advantageously, the wet composition is applied by spraying. Brushing is a simple, effective expedient. These and other application processes are well known in the art and are subject to many variations. The present composition is applied at any suitable concentration or rate to produce a material treated with an effective amount of the same.

Any suitable wood may be employed. Herein, the term, "wood," includes not only wood per se but also processed wood products such as plywood, beam laminates, engineered wood, oriented strand board, chipboard, pressboard, masonite, and so forth and the like, and other cellulosics, which can include paper, cardboard, and natural fibers such as of cotton, linen, hemp, bamboo and so forth and the like. The term, "wood," can be inclusive thus of its definition as disclosed in WO 2006/127016 A1, US 2006/0269677 A1, US 2009/0088481 A1 and US 2009/0143334 A1. The wood may be green or dried.

In general, conditions of treating the wood or other substrate are those sufficient to treat the same, which, when employing a wood or processed wood product as the substrate may include those conditions, including order of addition of components, amount or concentration, pH, temperature, time and so forth of the TRU-CORE® process for protecting wood products, or in WO 2006/127016 A1, US 2006/0269677 A1, US 2009/0088481 A1 or US 2009/0143334 A1, with the ammonium phosphate containing fire retardant and/or fluoropolymer, penetrating barrier, borate-containing formulation having resistance to water damage with protective properties coming from materials used in food packaging and cosmetics, and/or medium-to-long chain polar carboxyl substance, and/or other ingredient(s) substituted for the wood preservative. The ammonium phosphate containing fire retardant and so forth, and the wood preservative may be employed together. In such a process, any suitable amine oxide or amine oxide compound, may be employed. Suitable amine oxides to include amine oxide compounds are disclosed in WO 2006/127016 A1, US 2006/0269677 A1, US 2009/0088481 A1 and US 2009/0143334 A1. In such a process also, any suitable buffering agent, which may serve as an activator, may be employed. Suitable buffering agents are disclosed in WO 2006/127016 A1, US 2006/0269677 A1, US 2009/0088481 A1 and US 2009/0143334 A1.

The following example further illustrates the invention.

EXAMPLE

NO-BURN® Wood Gard™, NO-BURN® Original™ and/or NO-BURN® Fabric Fire Gard™ fire retardant liquid(s), with and without didecyldimethylammonium chloride and/or alkyldimethylbenzylammonium chloride mold inhibitor, permethrin insecticide and/or Masurf FP-815 CP (16% active ingredient) fluoroaliphaticpolyacrylate fluoropolymer stain repellant is(are) combined with DRIWRAP® coating material, KYNAR® AQUATEC liquid and/or aluminum stearate. The combination(s) is(are) applied to test cardboard, wood and/or fabric. Looks, durability, fire resistance, and optional additional active agent performance, can be good.

CONCLUSION TO THE INVENTION

The present invention is thus provided. Various feature(s), part(s), step(s), subcombination(s) and/or combination(s) may be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A composition comprising an ammonium phosphate containing fire retardant in combination with a fluoropolymer and/or a penetrating barrier, borate-containing formulation having resistance to water damage with protective properties coming from materials that otherwise are capable of being used in food packaging and cosmetics and/or a medium-to-long chain polar carboxyl substance, and/or a medium-to-long chain polar carboxyl substance without borate, wherein the composition is not in a form of a paint.

2. The composition of claim 1, which is aqueous, is a liquid of light to moderate viscosity, and contains a neutral ammonium phosphate.

3. The composition of claim 1, which contains at least one member of the group consisting of a mold inhibitor having activity against *Stachybotrys chartarum*, an insecticide having activity as a termiticide, a stain protector having activity against soil and/or stains, and a combination thereof, wherein said member is present in an amount effective for such activity.

4. The composition of claim 1, which includes the fluoropolymer.

5. The composition of claim 1, which includes the medium-to-long chain polar carboxyl substance, with or without borate.

6. The composition of claim 5, wherein the medium-to-long chain polar carboxyl substance, when considered as a pure compound, accords with the following general formula:

wherein:
"R" is, independently at each occurrence, an aliphatic moiety of about from ten to thirty carbons;
"m" is an integer of 1 or greater; and
"M" is, independently at each occurrence, H so as to make an acid provided that "m" is 1; an organic ester moiety to make an ester; and/or or a metal with a valence of "m" to make a salt.

7. The composition of claim 6, wherein the medium-to-long chain polar carboxyl substance includes aluminum stearate.

8. The composition of claim 7, wherein borate is substantially not present.

9. The composition of claim 1, which includes ingredients added with water in approximate percentages, which are selected to total 100%, as follows:

| | |
|---|---|
| Mono/diammonium phosphate(s) | 20~70% |
| Water | 25~50% |
| Spumific | 2.5~15.0% |
| Sugar | 4.0~12.0% |
| Polysaccharide resin | 2.0~40.0% |
| Added surfactant | 0% or 0.2~1.2% |

-continued

| | |
|---|---|
| Added defoaming agent | 0% or 0.01~0.5% |
| Mold inhibitor | 0% or 0.1~10% |
| Insecticide | 0% or 0.1~5% |
| Fluoropolymer latex resin | *0% or 3~30% |
| Penetrating barrier, borate-containing formulation having resistance to water damage with protective properties coming from materials used in food packaging and cosmetics | *0% or 1~70% |
| Medium-to-long chain polar carboxyl substance | *0% or 0.1~20% *At least some present from among these three ingredients collectively. |

10. The composition of claim 9, wherein the ingredients, which total 100%, are approximately as follows:

| | |
|---|---|
| Ammonium orthophosphate (40% aqueous solution) | 50~70% |
| Polysaccharide resin (45% aqueous solution) | 20~30% |
| Granulated cane sugar | 5~10% |
| Urea spumific | 5~7% |
| Potassium salicylate in solution, as defoaming agent | 0% or 0.01~0.1% |
| Alk-diMe-Bz-AmCl and/or diDe-diMe-AmCl mold inhibitor | 0% or 0.5~5% |
| Tenniticide including permethrin | 0% or 0.5~3% |
| Fluoropolymer latex resin, fluoropolytner acrylic type | *0% or 3~30% |
| Penetrating barrier, borate-containing formulation having resistance to water damage with protective properties coming from materials used in food packaging and cosmetics | *0% or 1~70% |
| Stearate of Al, Ca, Mg and/or Zn | *0% or 0.1~20% *At least some present from among these three ingredients collectively. |

11. The composition of claim 2, which is useful as a spray-on liquid of light viscosity and strength, which includes a foundational fire retardant formulation, in general, with ingredients, with approximate percentages by weight, as follows:

| | |
|---|---|
| Water | 70~90% |
| Phosphorus containing acid | 5~15% |
| Ammonium base | 5~15% |
| Wetting and/or other agent | 0.05~0.2% |
| Preservative | 0.01~0.1%, | to which foundational formulation is provided the fluoropolymer, penetrating barrier, borate-containing formulation having resistance to water damage with protective properties coming from materials used in food packaging and cosmetics, and/or medium-to-long chain polar carboxyl substance with or without borate.

12. The composition of claim 4, wherein, the fluoropolymer is selected from the group consisting of a fluoropolymer homopolymer, a fluoropolymer copolymer or modified fluoropolymer, and a combination thereof.

13. The composition of claim 12, wherein the fluoropolymer homopolymer is polyvinylidene fluoride; and the copolymer or modified fluoropolymer is an acrylic-modified fluoropolymer.

14. The composition of claim 13, wherein the fluoropolymer-acrylic blend is selected from at least one member of the group consisting of the following (A, B and C):
   (A) an acrylic-modified fluoropolymer, which is a lower alkyl (meth)acrylate;
   (B) a copolymer of vinylidene fluoride and a perhalogenated monomer; and
   (C) a fluoropolymer copolymer, wherein an acrylic component monomer for copolymerization is methacrylic acid, itaconic acid, hydroxyethyl acrylate, hydroxyethyl methacrylate, a carbonyl functional monomer, an acetoacetate functional monomer, an alkoxysilane methacrylate, an alkoxysilane acrylate, a vinyl ester, a vinyl ether, and/or styrene.

15. The composition of claim 1, which is a coating that, when applied to a flammable material, provides thermal protection for a solid material substrate that, when dried, reduces surface burning characteristics at least about 50%, when compared to untreated material as tested by a Steiner Tunnel Test according to ASTM E-84.

16. The composition of claim 3, which is a coating that, when applied to a flammable material, provides thermal protection for a solid material substrate that, when dried, reduces surface burning characteristics at least about 50%, when compared to untreated material as tested by a Steiner Tunnel Test according to ASTM E-84.

17. In combination, a combination comprising:
   a composition embracing an ammonium phosphate containing fire retardant in combination with a fluoropolymer and/or a penetrating barrier, borate-containing formulation having resistance to water damage with protective properties coming from materials that otherwise are capable of being used in food packaging and cosmetics and/or a medium-to-long chain polar carboxyl substance, and/or a medium-to-long chain polar carboxyl substance without borate, wherein the composition is not in a form of a paint; or a residue of said composition; and
   a flammable substrate on and/or in which the composition or its residue resides.

18. The combination of claim 17, wherein the substrate includes wood.

19. The combination of claim 17, wherein the composition is a coating that, when applied to the flammable substrate, provides thermal protection for the flammable substrate that, when dried, reduces surface burning characteristics at least about 50%, when compared to untreated material as tested by a Steiner Tunnel Test according to ASTM E-84.

20. The combination of claim 19, wherein the composition is a coating that, when applied to the flammable substrate, provides thermal protection for the flammable substrate that, when dried, reduces surface burning characteristics at least about 50%, when compared to untreated material as tested by a Steiner Tunnel Test according to ASTM E-84.

* * * * *